US008870663B2

(12) United States Patent
Cole

(10) Patent No.: US 8,870,663 B2
(45) Date of Patent: Oct. 28, 2014

(54) BAR TOP GAMING UNIT

(75) Inventor: Joseph W. Cole, Gallatin, TN (US)

(73) Assignee: Cole Kepro International, Inc., North Las Vegas, NV (US)

( * ) Notice: Subject to any disclaimer, the term of this patent is extended or adjusted under 35 U.S.C. 154(b) by 736 days.

(21) Appl. No.: 12/986,789

(22) Filed: Jan. 7, 2011

(65) Prior Publication Data

US 2012/0178539 A1 Jul. 12, 2012

(51) Int. Cl.

| | |
|---|---|
| ***A63F 13/00*** | (2014.01) |
| ***G07F 17/32*** | (2006.01) |
| ***A63F 9/24*** | (2006.01) |

(52) U.S. Cl.

CPC .............. *A63F 9/24* (2013.01); *G07F 17/3202* (2013.01); *G07F 17/3216* (2013.01); *G07F 17/322* (2013.01)

USPC ............................................................ 463/46

(58) Field of Classification Search

USPC ........................................ 463/46; 273/148 R

See application file for complete search history.

(56) References Cited

U.S. PATENT DOCUMENTS

| | | | | |
|---|---|---|---|---|
| 3,670,955 | A | | 6/1972 | Dominick et al. |
| 3,741,464 | A | | 6/1973 | Verbeke |
| 3,773,252 | A | | 11/1973 | Jensen |
| 3,804,294 | A | | 4/1974 | Householder |
| 4,133,530 | A | | 1/1979 | Takaichi et al. |
| 4,268,076 | A | | 5/1981 | Itoi |
| 4,314,336 | A | | 2/1982 | Bernstein et al. |
| D276,630 | S | | 12/1984 | Gimbel |
| 4,689,742 | A | | 8/1987 | Troy et al. |
| 4,744,614 | A | | 5/1988 | Gombosi |
| D312,666 | S | | 12/1990 | Lempke et al. |
| 5,046,735 | A | | 9/1991 | Hamann et al. |
| 5,110,129 | A | | 5/1992 | Alvarez |
| 5,129,330 | A | | 7/1992 | McKay et al. |
| D333,164 | S | | 2/1993 | Kraft et al. |
| 5,324,036 | A | | 6/1994 | Morrow |
| 5,533,605 | A | | 7/1996 | Mays et al. |
| 5,564,545 | A | | 10/1996 | Suzuki |
| 5,607,102 | A | | 3/1997 | Walsh et al. |
| 5,641,157 | A | | 6/1997 | Mays et al. |
| 5,655,966 | A | * | 8/1997 | Werdin et al. .................. 463/25 |
| D383,171 | S | | 9/1997 | Hanscom |
| 5,676,231 | A | | 10/1997 | Legras et al. |
| 5,700,195 | A | | 12/1997 | Halic |
| D388,835 | S | * | 1/1998 | Yamaguchi ................. D21/327 |

(Continued)

OTHER PUBLICATIONS

Players Choice Drop-In Bar / Slant-Top, International Game Technology, published by IGT circa Oct. 1995, in 2 pages.

(Continued)

*Primary Examiner* — David L Lewis
*Assistant Examiner* — Eric M Thomas
(74) *Attorney, Agent, or Firm* — Dickinson Wright PLLC

(57) ABSTRACT

A bar top gaming unit is configured to be mounted in a bar top or similar environment. The unit includes an air cooling system including at least one moveable air port. The air port has a first end located remote from the unit and a second end in communication with the interior, and where a position of the first end is changeable relative to the unit. The unit also includes an operator interface including at least one display. The operator interface is located at the rear of the unit and faces in an opposing direction from a main player display so as to be viewable by an operator located at a rear of the unit.

19 Claims, 3 Drawing Sheets

(56) References Cited

U.S. PATENT DOCUMENTS

| | | | |
|---|---|---|---|
| 5,715,923 | A | 2/1998 | Dekker et al. |
| 5,813,914 | A | 9/1998 | McKay et al. |
| 5,857,910 | A | 1/1999 | Watanabe et al. |
| 5,882,258 | A | 3/1999 | Kelly et al. |
| 5,967,287 | A | 10/1999 | Cole |
| 5,984,075 | A | 11/1999 | Schwarzli |
| 5,984,171 | A | 11/1999 | Schwarzli |
| 6,006,558 | A | 12/1999 | Peters |
| 6,015,344 | A | 1/2000 | Kelly et al. |
| 6,019,207 | A | 2/2000 | Cole |
| D424,122 | S | 5/2000 | Dickenson et al. |
| 6,068,101 | A | 5/2000 | Dickenson et al. |
| D428,062 | S | 7/2000 | Hayashi |
| 6,201,532 | B1 | 3/2001 | Tode et al. |
| D439,931 | S | 4/2001 | Yamaguchi |
| 6,251,014 | B1 | 6/2001 | Stockdale et al. |
| 6,264,556 | B1 | 7/2001 | Izawa et al. |
| 6,338,301 | B1 | 1/2002 | Almond |
| 6,435,970 | B1 | 8/2002 | Baerlocher et al. |
| 6,491,298 | B1 * | 12/2002 | Criss-Puszkiewicz et al. ........................ 273/148 R |
| 6,688,984 | B2 | 2/2004 | Cole |
| 6,699,128 | B1 | 3/2004 | Beadell et al. |
| 6,976,919 | B2 | 12/2005 | Cole |
| D515,144 | S | 2/2006 | Boyd |
| 7,241,222 | B2 | 7/2007 | Cole |
| D549,785 | S | 8/2007 | Luciano, Jr. et al. |

OTHER PUBLICATIONS

IGT:S-Plus Slant Top, International Game Technology, Oct. 1995, 2 pages.

* cited by examiner

BAR TOP GAMING UNIT

FIELD OF THE INVENTION

The present invention relates to gaming machines and, more particularly, to a gaming machine or device for location in or at a horizontal support such as a bar top.

BACKGROUND OF THE INVENTION

A wide variety of devices exist which are configured to present one or more games. These devices include the well known slot machine and video poker machine, each of which is configured to present at least one gambling or wager-type event. By the term gambling event, it is meant a game which requires a player to place a bet, such as a monetary wager, for the opportunity of winning an award, preferably in the form of money or credits representing money, if the outcome of a presented game is a winning outcome.

Slot and video machines have a wide variety of configurations. Commonly, these machines comprise upright cabinets or housings which support game implementing hardware, such as controllers, a video display, lights, buttons, a coin hopper, bill validator and cash box, and/or a wide range of other devices. The housing is generally taller than it is wide, and occupies substantial vertical space. Generally, the housing is sufficiently tall that when the gaming machine is placed on a short support or stand, the gaming machine may be used by a player who is standing.

In some instances, this normal configuration of a gaming machine is undesirable. For example, it is desirable to provide games for play at a bar. Generally, a bar is configured to include an upwardly extending wall. A bar surface is supported at the top of the wall. The bar surface is a generally horizontal, planar surface for supporting served drinks and food. A customer sits on one side of the wall, and a server such as a bar tender is located at an opposing side of the wall. Generally, the bar surface extends or overhangs over the wall some distance in both directions. This permits a customer's legs to be positioned under the bar surface while the bar surface is located close to the remainder of their body. Food and drink service elements may be stored under the bar surface at the opposing server's side of the wall. Shelves may be provided under the bar surface for supporting glassware. Often, one or more refrigerated units are located under the bar surface, these units used to house cooled beverages.

In this setting, a conventional gaming machine has numerous drawbacks. First, the height of such a conventional gaming machine is such that if it were placed on the bar surface, it would be positioned too high to be used by a customer. If placed upon the floor, the gaming machine would be too low and/or it would be located under the bar surface. The size of the gaming machine also prevents it from being integrated into the bar, as such would displace the space for customer's legs or food and drink service elements.

As a result of these drawbacks, bar top units have been developed. In general, existing bar top units comprise a housing supporting a display which faces upwardly and towards the front of the bar where a player is seated. A mounting hole is formed in the bar surface. A trim member is placed about the periphery of the bar top unit. Screws are extended parallel to the bar surface through the trim member and into the material forming the bar surface. The bar top unit housing is lowered into the bar surface until it rests upon the trim member. The bar top unit housing is then attached to an inwardly extending lip of the trim member with fasteners.

The configuration of current bar top units has numerous drawbacks. One problem relates to cooling. When the bar top units are dropped into the bar, they are generally located in a closed space inside of the bar. The bar top gaming unit may be configured to draw cooling air from that space and exhaust air back into that space. However, because the space is enclosed, the air in that space generally becomes heated or hot over time, thus rendering the air in the space ineffective for cooling purposes.

In order to address this problem, some bar top gaming units are configured with a front or rear panel which opens to the front or rear of the bar. This allows cooling air to be drawn into the bar top gaming unit from around, rather than within, the bar. However, this configuration requires that the bar top be cut and modified so that the front or rear of the bar top gaming unit becomes a front or rear of the bar. This makes the mounting of the bar top gaming unit much more complex.

Another problem relates to monitoring and servicing the bar top gaming machine. When the standard bar top gaming unit is located in a bar, the display thereof faces towards the front of the bar and displays game information in an orientation to be read by a player at the front of the bar. In the event the player needs assistance from the operator, such as to cash out their credits, it may be necessary for the bar tender or other operator to view the display to verify certain information. This is difficult, however, because the text and images are then upside-down when viewed from the side of the bar opposite the player.

Further, in some instances, such as the bar top gaming unit disclosed in U.S. Design Patent D549,785, a housing portion of the gaming unit actually extends upwardly into a position which generally blocks the view of the display from the bar side of the unit.

An improved bar top gaming unit is desired.

SUMMARY OF THE INVENTION

One aspect of the invention is a bar top gaming unit, including an improved configuration of such a unit. In one embodiment, a bar top gaming unit includes a movable air port. In another embodiment, a bar top gaming unit includes an operator interface.

One aspect of the invention is a bar top gaming unit with a moveable air port, such as movable air intake. The bar top gaming unit of the invention may have a housing which defines an interior space. An air port has a first end and a second end. The first end is located remote from the unit and the second end is in communication with the interior of the unit. For example, when the bar top gaming unit is mounted in the top surface of a bar, the first end may be located at a front wall of the bar at a point at which cool room air may be drawn into the air port for routing to the interior of the unit.

In one embodiment, the position that of the second end of the air port may be changed relative to the unit. In one embodiment, the second end of the air port may be associated with a slide which is movable along a track of the housing. In this manner, movement of the slide relative to the housing changes the position of the second end of the air port.

The air port may comprise a generally rigid plenum. In such a configuration, when the position of the second end of the plenum is changed, the position of the first end changes as well.

In accordance with this aspect of the invention, the position of an air port may be changed, such as to prevent interference when the bar top gaming unit is mounted in a bar or the like.

For example, the position of the air port may be changed to avoid interference with a refrigerator or other element mounted within the bar.

As another aspect of the invention, a bar top gaming unit may include an operator interface. In one embodiment, the bar top gaming unit has a front and a rear. One or more game or player displays are preferably oriented and configured to display information for viewing by a player located at a front of the unit. The operator interface preferably comprises at least one display oriented and configured to display information for viewing by an operator located at a rear of the unit.

In one embodiment, the operator interface comprises at least one operator display located at a rear of the unit. The at least one operator display is preferably configured to display information in reverse orientation to the information displayed by the player or main display.

The operator display might comprise one or more meters displaying numerical values or one or more electronic displays. The operator interface, such as an electronic display, may be configured to display the same information which is displayed by a main game display of the bar top gaming unit to a player thereof. Alternately or in addition, it might be configured to display other information, such as service or operator information.

In a preferred embodiment, the bar top gaming unit has at least one game display configured to display game information to a player located at a front of the unit. The game display is preferably configured to display information in a first orientation (for viewing/reading by such a player). The at least one operator display is preferably configured to display information in a reverse (upside down) orientation to the information displayed by the game display(s), whereby it is viewable by an operator located at a rear of the bar top gaming unit.

Further objects, features, and advantages of the present invention over the prior art will become apparent from the detailed description of the drawings which follows, when considered with the attached figures.

DETAILED DESCRIPTION OF THE INVENTION

Figure 1B:
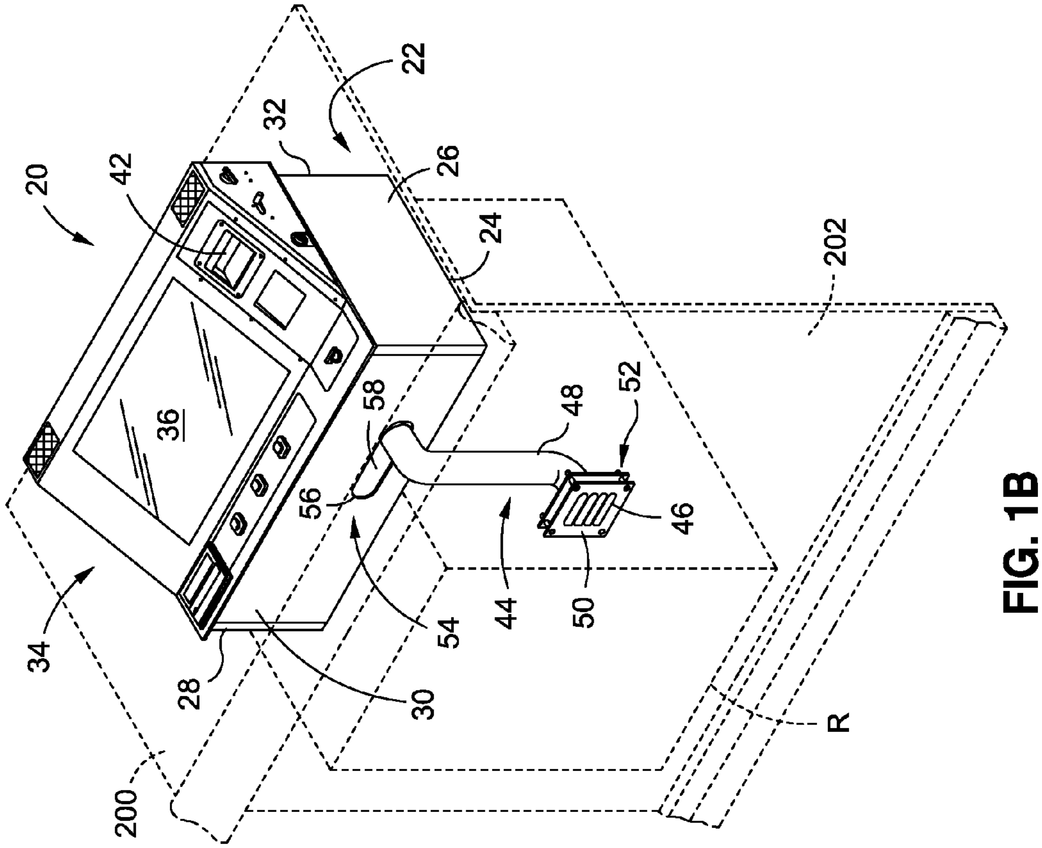
FIG. 1B is a perspective view of the bar top gaming unit illustrated in FIG. 1A with the air port of the unit arranged into a second position.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a gaming machine or unit. The gaming machine or unit has particular utility in association with a bar top or similar surface/structure, and as such is referred to herein as a bar top gaming unit. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of a bar top gaming unit 20 will be described with reference to FIG. 1A. As illustrated therein, the bar top gaming unit 20 includes a housing 22. In one embodiment, the housing 22 is defined by a bottom or base 24 and at least one wall extending upwardly from the base. In a preferred embodiment, first and second sides or sidewalls 26,28 extend upwardly from opposing sides or edges of the base 24. The housing 22 also includes front and rear walls 30,32 which extend upwardly from the base 24. The front and rear walls 30,32 extend between the first and second sides 26,28, the walls and sides thus defining a perimeter of the housing 22.

In one embodiment, the housing 22 is generally rectangular in shape. In this embodiment, the front and rear walls 30,32 are longer than the first and second sides 26,28.

The base 24, first and second sides 26,28 and front and rear walls 30,32 define a generally enclosed interior area. The first and second sides 26,28 and front and rear walls 30,32 have a top edge forming the perimeter of a generally open top of the housing 22.

In a preferred embodiment, a top panel 34 is connected to the housing 22 and is movable between a closed position in which it generally encloses the otherwise generally open top of the housing 22 and an open position in which the top of the housing 22 remains generally open. In this regard, the top panel 34 may be referred to as a lid, deck or door.

In one embodiment, one or more hinges (not shown) connect a back edge of the top panel 34 to the rear wall 32. The one or more hinges permit the top panel 34 to be rotated into a closed position in which it extends over the otherwise open top of the housing 22. The one or more hinges also permit the top panel 34 to be rotated upwardly into a position in which it does not generally obscure the open top of the housing 22, thus permitting access to the interior area thereof. Other means may be provided for movably connecting the top panel 34 to the housing 22, such as pins or the like. Also, the top panel 34 might be configured to hinge or rotate about one side 26,28 of the housing 22 rather than the rear wall 32.

In one embodiment, the base 24, first and second sides 26,28, and front and rear walls 30,32 are constructed of metal. In one embodiment, metal plates or panels are connected, such as by welding. These members may also be formed as a unitary construction. The top panel 34 may also preferably be constructed of metal.

The bar top gaming unit 20 also includes a plurality of components or devices for use in presenting one or more games to a player. In one or more embodiments, the housing 22 is specifically configured to accommodate these devices.

In a preferred embodiment, the bar top gaming unit 20 is configured to present one or more gambling or wager type games. By a gambling or wager type game, it is meant a game which requires that the player place a bet or wager in order to play the game. In a preferred embodiment, a player is provided an award in the event the outcome of the game is a winning outcome. A variety of games may be implemented, including games of skill and/or chance.

Figure 1A:
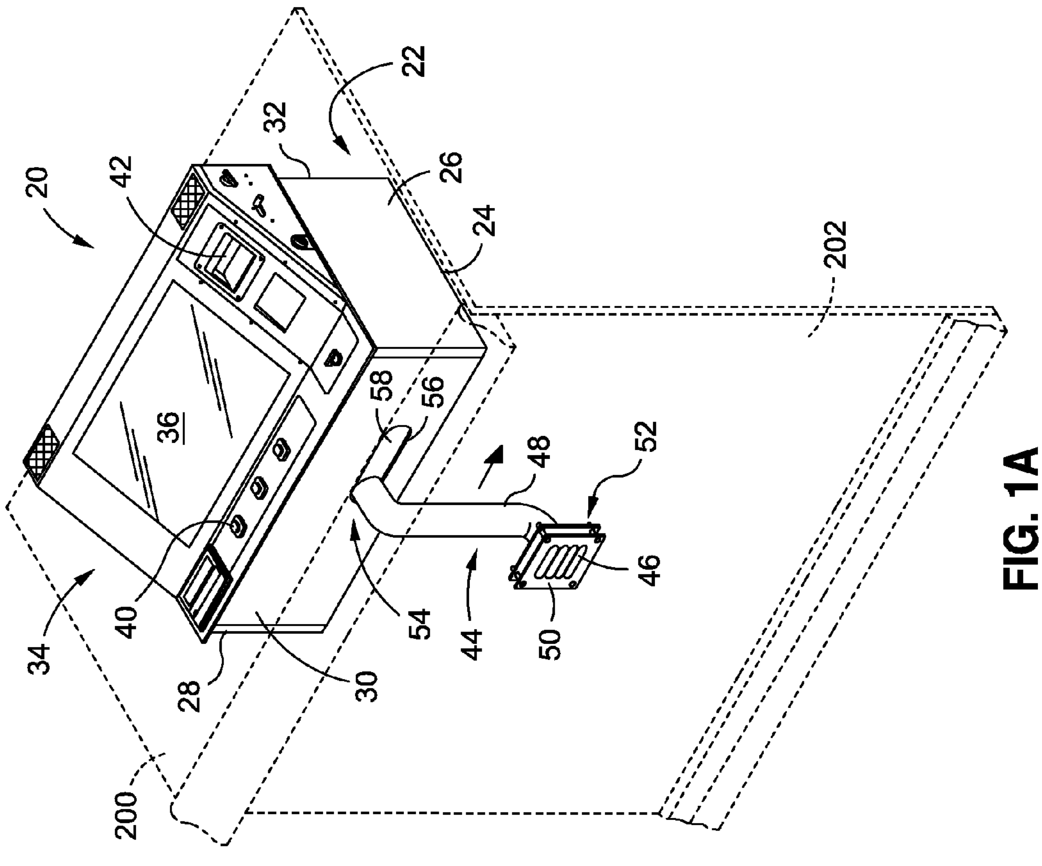
FIG. 1A is a perspective view of a bar top gaming unit located in a bar top environment, an air port of the unit arranged in a first position.

Referring to FIG. 1A, in one embodiment, the bar top gaming unit 20 includes at least one game display 36 for displaying visual game information to a player. The game display(s) 36 may be of a variety of types. In a preferred embodiment, the game display 36 is an LCD display. The display 36 may comprise other types of video displays, such as plasma or CRT. The display may also comprise a mechanical display, as in the case of a set of rotating reels. The bar top gaming unit 20 might include multiple displays, such as a main game display and a secondary or bonus display.

In a preferred embodiment, the game display 36 is mounted to the top panel 34 of the housing 22. In a preferred embodiment, the game display 36 is mounted to an inner or side surface of the top panel 34, such as with a mounting bracket. The game display 36 may be mounted in alignment with an opening in the top panel 40, thus permitting the game display 36 to be viewed there through. In other embodiments, the game display 36 might be mounted to the top of the top panel 34 or it might be mounted in the housing 22 or between the housing 22 and the top panel 34, wherein the top panel 34 opens and closes over the game display 36.

As illustrated in FIG. 1A, at least a rear portion of the top of the top panel 34 may be sloped, such as upwardly from the front of the unit 20 towards the rear of the unit 20. In this manner, the display 36 is mounted an angle relative to the horizontal. For example, the display 36 may be mounted at an angle of between 20 and 45 degrees relative to the horizontal.

As described in more detail below, the game display 36 is preferably configured to display information to a player located at the front of the bar top gaming unit 20. In one embodiment, the game display 36 is tilted upwardly (such as by being mounted to a sloping portion of the top panel 34) towards the player (i.e. the display having a top edge which is positioned higher in elevation that a bottom edge). Also, text and other game information displayed by the game display 36 are preferably oriented in a first position (preferably, an upright position wherein a top of the game information is oriented towards the top edge of the display and a bottom of displayed game information is oriented towards the bottom edge of the display) for viewing/reading by a player located at the front of the bar top gaming unit 20.

In one embodiment, a gaming controller is provided for implementing or presenting one or more games, such as generating game information such as game play and outcome information and displaying such on the game display 36, and communicating with one or more other devices such as peripheral devices of the unit 20. The gaming controller may be adapted to perform one or more of a wide variety of other functions.

The gaming controller may have a variety of configurations, as known to those of ordinary skill in the art. In one embodiment, the gaming controller includes a processor for executing program code, a memory for storing information, and a bus connecting the processor and memory and permitting communication with a wide variety of other devices. The other devices may include a mass storage device, such as a hard drive, a video controller associated with the display 36, and other peripheral devices. The processor may be of a variety of types, including those which are commercially available from companies such as Sun Microsystems, AMD and Intel. The memory may also be of a variety of types, such as RAM, EEPROM and the like.

The bar top gaming unit 20 may be configured in a "stand alone" type configuration in which the gaming controller is configured to execute computer readable code to present one or more games. In other embodiments, the bar top gaming unit 20 may be configured as a terminal or networked device. In such a configuration, certain game information may be generated or provided from a remote server, host or other device to the gaming controller, such as via a network link. In such a configuration, the gaming controller may merely comprise a video controller for presenting information on the game display 36 or it might have other functions, though less than those where the game controller is configured to directly generate or provide the game information.

The game controller is preferably located in the interior space of the housing 22, such as below the game display 36. The game controller may be located in a protective housing or casing which is in turn located in the housing 22.

In one embodiment of the invention, at least one player input device is provided for allowing the player to interact with the gaming controller. In one embodiment, the game display 36 may be of a touch-sensitive type. In one embodiment, the bar top gaming unit 20 might include one or more touch-sensitive panels, such as for displaying button or other input areas, or might include one or more push-buttons, joysticks, arms, handles, keypads or other input devices.

In one embodiment, as illustrated in FIG. 1, one or more buttons 40 are connected to the top panel 34. The buttons 40 may be of a variety of types and sizes, such as square, rectangular or circular push-buttons. The buttons 40 may be illuminated. Preferably, the buttons 40 have an output which is connected to the gaming controller, such as an associated bus, whereby an input to a button yields an input signal to the controller. The buttons 40 may be used to provide input regarding a variety of actions, such as "bet credit," "cash out," "hold" or a variety of selections associated with the play of a game. In one embodiment, the buttons 40 may be located at a generally planar front portion of the top of the top panel 34, such as forwardly of the display 36.

In a preferred embodiment, the bar top gaming unit 20 includes one or more peripheral devices. These peripheral devices may include one or more of a media reader, a media writer, a currency acceptor and validator, a currency storage device, a coin acceptor, a coin hopper, various combinations thereof and/or other devices now known or later developed.

In one embodiment, the bar top gaming unit 20 includes a media reader and/or writer 42. In one embodiment, the media reader/writer 42 may be configured to receive and read/validate currency, printed tickets or other media, and be configured to write or associate information with media, such as by printing information on paper tickets. The media reader/writer 42 may be located within the housing 22 and extend through the top panel 34.

Of course, the media reader/writer might have other configurations, such as being configured to read information associated with a magnetic stripe on a media and/or write information to such a stripe. The media reader/writer may also be arranged to read information from or write information to smart cards, including cards having associated microchips. The media reader may also be an optical scanner, reading bar codes or other printed or displayed information.

In those instances where the media reader/writer 42 is configured to accept currency and/or tickets, the media reader/writer 42 may include a storage box, such as a locked container located within the housing 22. In those instances where the media reader/writer 42 is configured to dispense media, such as printed tickets, the media reader/writer 42 may include a supply of tickets, cards or other media to be dispensed. The supply may be located within the housing 22.

Regardless of the type of peripheral device installed, the device is preferably placed in communication with the gaming controller, such as by way of a communication interface associated with the bus of the controller. In this manner, the gaming controller may receive input from the device, such as information read from a card or control signals, and may send output to the device for controlling it. For example, the gaming controller may cause the media writer/such as a ticket printer, to print a receipt containing specific information.

In a preferred embodiment, the bar top gaming unit 20 includes a cooling system. In a preferred embodiment, the position of at least one portion of the cooling system, such as an air port thereof, is changeable relative to the bar top gaming unit.

In one embodiment, the cooling system comprises at least one air port. The air port may comprise an inlet or intake through which air is drawn from outside of the bar top gaming unit 20 into the interior area of the housing 22. As described in more detail below, the cooling system preferably also comprises at least one outlet or exhaust through which air is expelled from the interior area of the housing 22 to a point exterior to the bar top gaming unit 20.

In a preferred embodiment, an air port comprises an air intake 44 having an inlet 46 which is located remote from the housing 22 of the bar top gaming unit 20. As illustrated, the intake 44 comprises an air pathway or plenum 48 which leads from the inlet 46 to the housing 22 of the bar top gaming unit 20.

The plenum 48 may comprise, for example, a tube comprising a wall which surrounds a generally open pathway. The tube might comprise, for example, a flexible or generally rigid elongate body having a first end 52 and a second end 54 and being generally closed between its ends.

The inlet 46 of the air intake 44 may comprise or be located at the first end 52 of the plenum 48. In one embodiment, the inlet 46 may include a cover 50, as described in more detail below. The second end 54 of the plenum 48 is preferably located at or in the housing 22 of the bar top gaming unit 20, and preferably comprises a second end or outlet of the air intake 44, so that the air pathway there through leads into the interior of the housing 22.

In a preferred embodiment, the position of the air intake 44 relative to the bar top gaming unit 20, including the housing 22, may be changed or adjusted. In one embodiment, where the air intake 44 is defined by an end of a plenum, the end of the plenum (such as the second end 54 of the plenum 48 as illustrated) is movably mounted to the housing 22 of the bar top gaming unit 20, thus permitting its position to be altered. In one embodiment, such as where the plenum 48 is generally rigid, a change in the position of the second end 54 of the plenum 48 may be accompanied by a change in the position of the air inlet 46 of the air intake 44.

In the illustrated embodiment, means are provided for changing the position of the second end 54 of the plenum 48 relative to the housing 22. In one embodiment, the means comprises an aperture, such as a slot 56, located in the housing 22 and a slide 58 to which the plenum 48 is connected, the slide 58 movable relative to the slot 56.

In one embodiment, the slide 58 is a generally planar mount such as an elongated plate. The slide 58 is mounted for movement relative the slot 56. In an embodiment where the slot 56 is elongate and is generally horizontally extending, the slide 58 is similarly shaped, such as being an elongate plate having a width along the horizontal axis which is greater than a height in a vertical direction. The slide 58 has a width which is sufficiently greater than the width of the slot 56 such that when the plenum 48 is moved from side to side in the slot 56, at least a portion of the slide 58 covers or fills the slot 56, as described in more detail below.

The slide 58 may be mounted in a track, such as one or more guides. In the illustrated embodiment, the slide 58 lies in a vertical plane. Of course, the slide 58 might be mounted on or be configured to move relative to one or more rollers, ball bearings, low-friction mounts or the like.

The second end 54 of the plenum 48 is preferably connected to the slide 58. Preferably, the open second end 54 of the plenum 48 leads into the interior of the housing 22 of the bar top gaming unit 20.

It will be appreciated that the bar top gaming unit 20 could include two or more intakes, at least one of which is preferably position adjustable as described herein.

As indicated, the cooling system preferably also includes at least one exhaust or air outlet. In one embodiment, the at least one exhaust comprises one or more openings in the housing other than the opening to the plenum 48 at the second end 54 thereof. In order to affect the maximum flow of air through the entirety of the housing 22, in a preferred embodiment, the at least one exhaust may be located generally opposite the intake 44 relative to the housing 22. In the configuration illustrated where the intake 44 is located at the front 30 of the housing 22, the at least one exhaust 60 may be located in the rear 32 of the housing 22, such as illustrated in FIGS. 2 and 3.

In order to aid the flow of heated air out of the interior area of the bar top gaming unit 20, at least one exhaust vent may be located near a top of the unit 20. In this manner, as air is heated in the interior of the unit and it rises upwardly, it naturally flows towards the exhaust 60. In addition, the flow of heated air out of the exhaust 60 may generate a convective flow through the interior of the unit 20, thus improving or aiding the rate of air flow through the unit 20.

Figure 2:
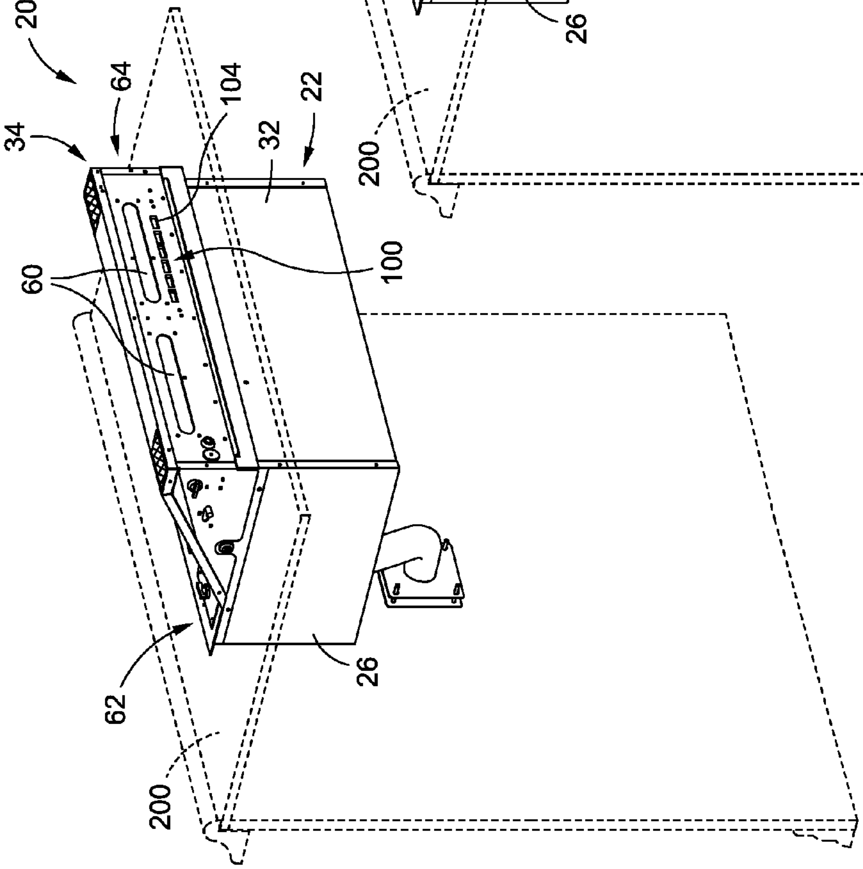
FIG. 2 illustrates a first embodiment of an operator interface of a bar top gaming unit in accordance with the invention.
Figure 3:
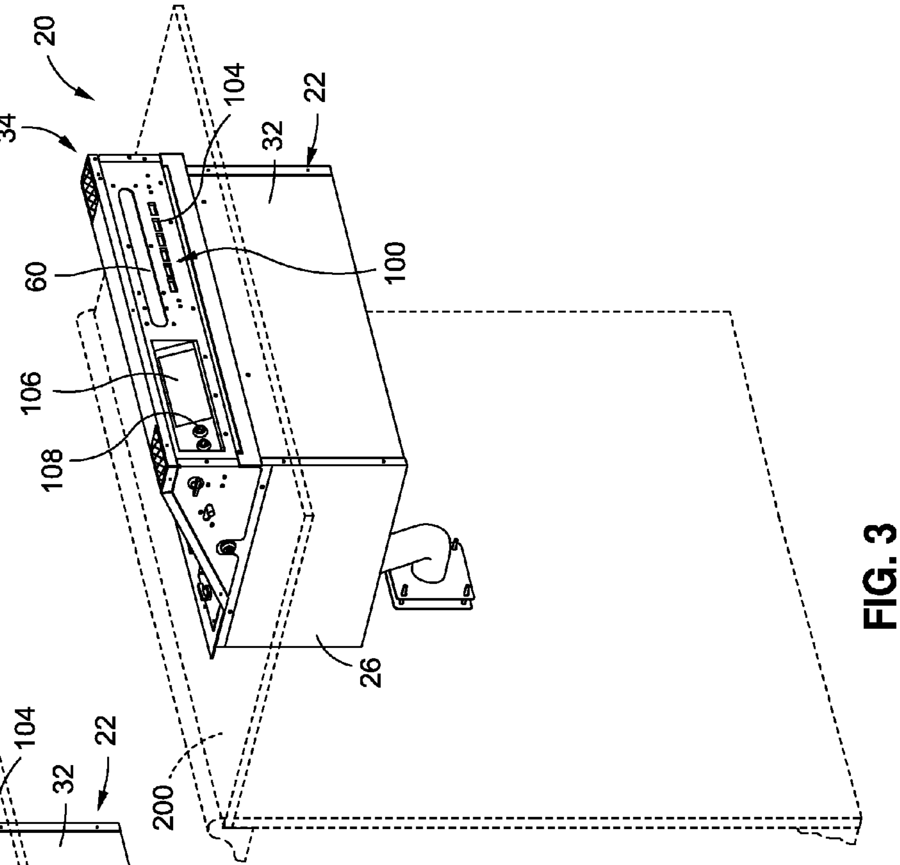
FIG. 3 illustrates a second embodiment of an operator interface of a bar top gaming unit.

In one embodiment, as best illustrated in FIGS. 2 and 3, the top panel 34 may have a front 62 and a rear 64 which generally correspond to the front 30 and rear 32 of the housing 22. The rear 64 of the top panel 34 may have various configurations. As illustrated, the rear 64 may comprise a generally vertical face or surface. As illustrated, the at least one exhaust 60 may comprise one or more vents located in that face comprising the rear 64 of the top panel 34. In order to improve the cooling effect as just described, the at least one exhaust 60 is preferably located near the top of the rear 64 of the top panel 34.

FIG. 2 illustrates a configuration wherein a pair of elongate oval openings comprises the exhaust vents 60. FIG. 3 illustrates a configuration wherein a single elongate oval opening comprises the exhaust vent 60. Of course, the exhaust vents might have other shapes and/or one or more exhaust vents might have other locations. For example, the exhaust 60 might comprise at one vent in the top panel 34 and at least one or more vents in the housing 22.

The one or more exhaust vents 60 may include a vent cover, such as a louvered grill, downwardly extending deflector or hood or the like. Such a cover or deflector may server to limit access to the interior of the unit 20 (for security purposes) and to prevent foreign matter/debris from entering the interior of the unit 20 through the vent(s). Of course, the vents 60 might have other shapes and configurations.

In one embodiment, the cooling system of the bar top gaming unit 20 includes at least one air mover. The air mover is preferably configured to move air through the housing whereby air is drawn through the at least one intake 44 and expelled through the at least one exhaust 60.

The air mover may comprise at least one fan or blower (not shown). Such a fan or blower is preferably electrically driven and may be controlled by one or more controllers (such as a gaming unit controller or a temperature controller). The at least one fan or blower may be associated with the intake 44 in order to draw air into the intake, whereby a high air pressure environment is created in the housing 22 and air then naturally flows through the housing 22 to the at least one exhaust 60. In another embodiment, the at least one fan or blower may be associated with the exhaust 60, whereby a low pressure environment is created in the housing 22 and air naturally flows through the intake 44 into the housing 22.

Additional details regarding the cooling system of the bar top gaming unit 20 are provided below relative to a description of the use of the unit 20.

In a preferred embodiment, the bar top gaming unit 20 includes an operator interface 100. The operator interface 100 is best illustrated in FIGS. 2 and 3. In a preferred embodiment, the operator interface 100 comprises at least one device configured to display information regarding the bar top gaming unit 20 to an operator/servicer.

In one embodiment, the at least one display device may comprise at least one meter 104. The at least one meter 104 may comprise a display device configured to display gaming machine "meter" information as is well known in the art. Such information might comprise, for example, information regarding the number of credits wagered and/or won at the bar top gaming unit 20. The one or more meters 104 may be controlled or linked to the controller of the bar top gaming unit, whereby as a player wagers credits or as credits are awarded, the displayed meter information is updated by the controller.

The at least one meter 104 might comprise a mechanical display of information, such as one or more rotating numbered reels, similar to an odometer. The reels may be located behind a cover, such as a clear glass cover. Alternatively, the meter 104 might comprise an electronic display or other information display device.

As illustrated in FIGS. 2 and 3, the bar top gaming unit 20 might include multiple meters 104. Individual meters 104 may be provided for displaying different information. For example, a first meter might display a numerical value of "coin in" (i.e. the value of monies provided to the bar top gaming unit 20), "coin out" (i.e. the value of monies paid out by the bar top gaming unit) or other values.

In one embodiment, the display may comprise at least one operator display. FIG. 3 illustrates such an embodiment wherein the game display comprises at least one electronic display 106. The display 106 might comprise an LCD, LED, plasma, CRT or other type of display now known or later developed. The size of the display 106 may vary, such as depending upon the available space at the back of the bar top gaming unit 20.

Preferably, the operator display 106 is configured to display information regarding the bar top gaming unit 20, and most preferably, information regarding game play by a player. For example, the operator display 106 is configured to display the same game information to an operator as is displayed to a player via the one or more game displays 36. Thus, in a preferred embodiment, the operator display 106 is controlled by the same game controller as the game display 36. The operator display 106 may be controlled by a video controller which, for example, receives information from the game controller.

In another configuration, the operator display 106 may be configured to display information to an operator which is not normally displayed to a player, such as operator or services information which is typically displayed by the game display(s) 36 only when the bar top gaming unit 20 is placed in a service mode or the like. For example, the operator display 106 might display information regarding a status of the bar top gaming unit 20 (such as any faults, errors or the like), historical gaming information, information regarding past game play, and other service information as is well known in the art.

In one embodiment, such operator information may be displayed upon command from an operator. For example, the operator display 106 may display a graphical user interface (GUI), menu or the like, from which an operator may make selections regarding the information to be displayed by the operator display 106. The operator display 106 may be configured with a touch screen, whereby the operator may provide input by touching the display 106. In other embodiments, an operator might provide input via one or more buttons, a joystick, or other input device (not shown).

In an embodiment where the operator display 106 may be configured to display other than a duplicate of the information displayed on the game display(s) 36, the operator display 106 may be separately controlled by the game controller or it might be controlled by a separate controller, such as subcontroller associated with a master gaming unit controller. Of course, there are a variety of ways the operator display 106 may be configured to display a variety of desired information.

As indicated, it is also possible for the operator interface 100 to include more than one operator display 106. For example, the operator interface 100 might include a first operator display which displays a duplicate of the information displayed to the player via the game display(s) 36 and at least one second operator display which is capable of displaying operator or service information.

Preferably, the one or more displays of the operator interface 100 are configured to display information in an orientation for viewing by an operator located at a rear of the unit (such as an operator located at a rear of a bar generally opposite a player). In one embodiment, the one or more displays display information in a reverse orientation to the information displayed by the main display(s) 36. In such an orientation, information such as text and images are generally upside-down to that information displayed by the main display(s) 36. In this manner, the information displayed by the display(s) of the operator interface 100 is right side up when viewed by an operator at the rear of the unit 20, but upside down if such were visible to a player or person located at the front of the unit 20.

The operator interface 100 may also include other features. For example, the operator interface 100 may include one or more key-activated switches 108, locks or the like, such as for resetting the bar top gaming unit 20, unlocking the unit for service or for other purposes.

In use, the bar top gaming unit 20 is preferably located in a bar top or similar environment. As illustrated in FIGS. 1A and 1B, a bar may have a top surface 200 and a front wall 202. The bar top gaming unit 20 is preferably mounted in the top surface 200. The bar top gaming unit 20 is oriented so that at least a portion of the housing 22 is located in an interior of the bar below the bar top 200. Preferably, at least the top deck 34 is located above the bar top 200.

The bar top gaming unit 20 may be arranged so that the front thereof faces the front wall 202 of the bar. In this orientation, the main display 36 thereof is oriented towards a player located in front of the bar top gaming unit 20 and at a front of the bar.

In a preferred embodiment, the air intake 44 is oriented so that the inlet 46 thereof is positioned at the front wall 204 of the bar. As illustrated, the first end 52 of the plenum 48 extends through the front wall 204 of the bar. The cover 50 is located over the inlet 46 at the first end 52 of the plenum 48. As illustrated, the cover 50 may define a plurality of openings which are located under protective shields, whereby liquid or the like is directed around and over, rather than into, the openings in the cover 50 which lead into the plenum 48.

In accordance with the invention, the position of the air intake 44, and preferably its connection to the bar top gaming unit 20, may be adjusted. As illustrated in FIG. 1A, the plenum 48 may be arranged so that the second end 54 of the air intake 44 is located to the far left side of the slot 56, whereby the plenum 48 generally extends from the middle of the housing 22. On the other hand, as illustrated in FIG. 1B, the plenum 48 may be shifted so that the second end 54 of the air inlet extends from the far right side of the slot 56 in the housing 58. In this position, the plenum 48 generally extends from the right side of the housing 22. In the embodiment illustrated, the position of the second end 54 of the air intake 44 may be changed by moving the slide 58 relative to the slot 56 in the housing 22.

Of course, in the arrangement illustrated where the slide 58 may move freely along the length of the slot 56, the second end 54 of the air intake 44 may be positioned at various locations between the ends of the slot 58. As indicated above, in an embodiment in which the plenum 48 is generally rigid, when the position of the second end 54 of the air intake 44 changes relative to the housing 22, the position of the first end 52 (and thus the position of the air inlet 46 of the air intake 44) also changes.

In the embodiment illustrated the slot 56 has a first end near the middle of the housing 22 and a second end towards a first side 26 of the housing 22. The position of the slot 56 and/or its length may vary, thus enabling the plenum 48 to be mounted to the housing 22 in other positions. For example, the slot 56 could be generally centrally located to the housing 22, might extend towards the opposing side 28, etc.

In one embodiment, the slot 56 and/or slide 58 might permit the position the air intake 44, such as the second end 54 of the plenum 48, to be changed vertically relative to the housing 22 and the bar. For example, the slot 56 might have one or more vertically extending portions or might have a vertical dimension which is greater than that of second end 54 of the plenum 48, thus permitting the plenum 48 to move up and down in or relative to the slot 56.

The ability to change the position of the air intake 44, and most preferably its location/connection to the bar top gaming unit 20, has numerous advantages. Generally, the bar with which the bar top gaming unit 20 is associated has other associated elements. For example, refrigerators and the like may be located under the bar, other bar top gaming units 20 may be located along the length of the bar and the like. The ability to change the position of the air intake 44 at the bar top gaming unit 20 allows the user avoid such obstacles that might otherwise pose an impediment to mounting the bar top gaming unit 20 in the bar.

For example, as illustrated in FIG. 1B, a refrigerator R may be located under the bar. If the second end 54 of the air intake 44 were fixed relative to the housing 22 in the position illustrated in FIG. 1A, it and/or the plenum 48 would interfere with the refrigerator R when the bar top gaming unit 20 is located in the position in FIG. 1B. However, by moving the position of the second end 54 of the air intake 44 to the right, it can be moved to a position where it does not interfere with the refrigerator R.

As indicated above, in one embodiment, the plenum 48 may be relatively rigid, wherein when the position of the second end 54 is changed, the position of the entire plenum 48 (including the first end 52 thereof comprising the inlet 46 of the air intake 44) also moves. However, in other embodiments, such as where the plenum 48 comprises a flexible tube, a change in position of the second end 54 thereof might not result in movement of the remaining portion or all of the plenum 48 (for example, in such an embodiment, the position of the first end 52 thereof might remain fixed).

Another advantage of the intake 44 of the preferred embodiment of the invention is that it is located at the front of the bar. In this location, air is drawn from the open space in front of the bar into the housing 22. This represents a significant advantage over prior art configurations where cooling air is drawn from within the bar itself, which air may not be very cool because of the confined space within the bar, various devices expelling heated air into that interior bar area, and lack of air circulation in the interior of the bar.

It will be appreciated that while in a preferred embodiment air is drawn through the air intake 44, that air pathway could be used as an exhaust. In such an embodiment, air might be drawn into the bar top gaming unit from one location (such as at rear thereof) and the heated air might then be expelled through the plenum 48. Such an embodiment of the invention still has the advantage that the location of the second end 52 of the plenum/air path is movable relative to the bar top gaming unit 20.

Figure 4:
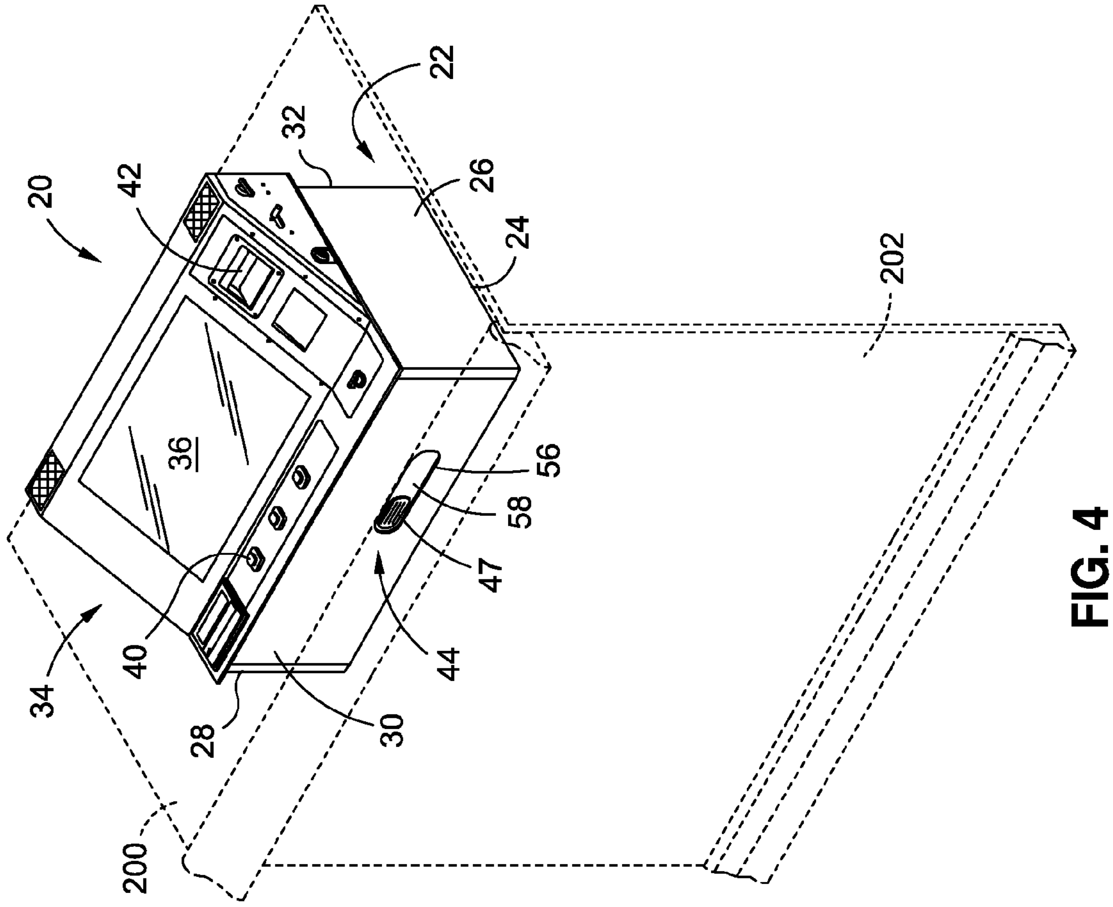
FIG. 4 illustrates another embodiment of an air port of the invention.

In another embodiment of the invention as illustrated in FIG. 4, it is possible for the air intake 44 to simply comprise a vent or opening 47 at the housing, rather than an elongated plenum. For example, the air intake 44 might comprise a vent or opening 47 which is located in the slide 58. By moving the slide 58 relative to the slot 56, the position of the vent or opening 47 may thus be changed. While in this configuration a change in position of the vent or opening 47 does not change a corresponding position of a remote opening, this configuration of the invention still has the same advantages that the position of the intake is changeable. For example, in some instances it may be permissible for cooling air to be drawn from within the bar. In that instance, an elongate plenum may not be necessary. However, various bar features may still interfere with the flow of air to the bar top gaming unit 20, such that movement of the vent or opening directly on the unit 20 is beneficial. Also, in some embodiments it may be possible to mount the bar top gaming unit 20 so that the front thereof is located at the front of the bar, whereby a vent or opening directly on the unit 20 is exposed to the outside of the bar or other support structure. Also, in other configurations of the invention, the air intake 44 might still comprise a short tube or plenum leading from the housing 22, though not terminating at the front of the bar (for example, the plenum might terminate at the rear of the bar or within the bar).

Referring to FIGS. 2 and 3, another advantage of the invention is the operator interface 100. Generally, an operator or servicer of the bar top gaming unit 20 is located behind the unit 20 opposite the player. For example, the bar is generally configured so that it extends in front of or around a service area. Players sit on the exterior or front side of the bar, while a bartender is located at the interior or rear of the bar. In this manner, the bartender is located in the service area.

Advantageously, the operator interface 100 of the bar top gaming unit 20 faces rearwardly towards the rear of the bar and thus towards the operator or servicer, such as the bartender.

In this orientation, information is provided or displayed by the one or more displays thereof, such as the operator display 106 and/or the one or more meters 104, which information is readily viewable by the operator. For example, as indicated above, the displayed information may comprise a duplicate of the game play information displayed to a player via the main display 36. The information may also include service information and game meter information.

The bar top gaming unit 20 may include other features. For example, the bar top gaming unit 20 might include more than one game display or it might include other visual display devices, such as one or more lights, spinning reels or the like.

The bar top gaming unit 20 might include one or more audio generating devices such as one or more speakers. The speakers might be associated with the gaming controller, such as via the bus of the controller or via an audio controller which is associated with the bus. In this manner, audio information is transmitted to the speakers, and the speakers in turn generate the audio information. In one embodiment, the speakers are of the well-known electro-mechanical diaphragm type.

As indicated above, the bar top gaming unit 20 may be associated with one or more other devices. In one embodiment, the gaming unit is associated with a network including at least one communication link between the gaming unit and another device. The gaming controller may include or be linked to a communication interface. The communication interface or adapter may be adapted to send and receive information in one or more of a variety of communication protocols. These protocols may include Bluetooth or other protocols for transmitting and receiving data over a wireless communication link, or USB, Ethernet, IEEE-1394 or other protocols for transmitting and receiving data over a wired communication link. In one embodiment, the gaming unit may be associated with a player tracking or reward system network, a gaming unit security/monitoring network, a game server, a bonusing system/server, an accounting system, and/or a wide or local area progressive or other award system. Such networks/systems are well known.

The housing 22 of the bar top gaming unit 20 may have shapes other than that described above. As noted, in a preferred embodiment, the first and second sides 26,28 and front and rear walls 30,32 form a generally rectangular housing perimeter. The housing 22 may have a generally square perimeter. The housing 22 may have other shapes, such as oval or elliptical. In one embodiment, one or more wall members extend upwardly from a base, the wall member(s) forming the perimeter. For example, a continuous wall may form an oval perimeter of the housing 22. In such event, the top panel 34 may be of a similar shape, or may still be rectangular. In all cases, the one or more main display(s) 36 preferably face towards a front of the unit and the operator interface 100 preferably is located at and faces a rear of the unit (in generally an opposing direction to the game display(s) 36.

In one embodiment, the top panel 34 of the bar top gaming unit 20 may be fixed or the housing 20 may have a top and the game display 36 and other features may be associated with the top. In such a configuration, access may be provided to the interior of the bar top gaming unit 20 in other manners (than by opening the top panel 34), such as by one or more access openings or doors in the housing. In other embodiments, the top panel 34 of the bar top gaming unit 20 may comprise only some portion of a top of the unit (such as a smaller door or lid, in which case, for example, a top of the rear portion of the bar top gaming unit 20 may be defined by the housing 22 and not the top panel 34).

The bar top gaming unit 20 may be configured to present a variety of games and may be configured in a variety of manners. The gaming controller may be configured to present a variety of different games, including more than one game. Such games might comprise bingo, keno, poker, video slot or other games now known or later developed.

Appropriate connections are made to the bar top gaming unit 20, such as a power connection for providing electrical power thereto for powering the display 36, peripherals and the gaming controller.

In the event access is needed to the interior area of the housing 22, appropriate personnel may release the top panel 34. In one embodiment, one or more locks, latches or combinations thereof may be used to secure the top panel 34 in a closed position. Once released, a user may raise the top panel 34 into an open position. Once raised, the top panel 34 may remain in its open position with the aid of a support strut or the like. Access is provided to the interior area of the housing 22 via the opening at its top.

It will be appreciated that while the gaming machine herein has been referred to as a bar top gaming unit, the gaming machine might be installed in other environments and be referred to by other names. For example, the unit might be installed in other generally planar surfaces or elements than a bar top, such as a table top, counter or the like. Also, while the aspects of the invention have particular applicability to a bar top gaming unit, those features may be applied to other gaming machines or environments. For example, the moveable vent/air opening feature of the invention might be applied to other types of gaming machines (such as slant, upright or machines having other configurations), where the ability to change the position of the vent/air opening may be beneficial.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A bar top gaming unit comprising:

a housing having a top and at least one side wall;

a top deck mounted to said housing and extending over said top of said housing and cooperating with said housing to define a generally enclosed interior area;

at least one game display located at said top deck, said at least one game display configured to display game play information;

at least one player input device; and an air cooling system including at least one moveable air port, said air port having a first end located remote from said interior area and at least one second end in communication with said interior area;

said second end of said air port movably mounted to said housing for allowing a location of said at least one second end to be changed relative to said housing.

2. The bar top gaming unit in accordance with claim 1 wherein said air port comprises a generally rigid plenum.

3. The bar top gaming unit in accordance with claim 1 wherein said at least one second end is connected to a slide and said slide is movably mounted along a slot in said housing.

4. The bar top gaming unit in accordance with claim 3 wherein said slot is elongate and extend generally horizontally along a portion of a front of said housing.

5. The bar top gaming unit in accordance with claim 4 wherein said air port comprises a plenum having a diameter at said second end, a length of said slot being at least twice the diameter of said plenum at said second end.

6. The bar top gaming unit in accordance with claim 3 wherein said housing has a front, said at least one game display configured to display game information in an orientation facing said front of said housing, and wherein said slot is located at said front of said housing.

7. The bar top gaming unit in accordance with claim 1 further comprising at least one air moving device configured to move air through said air port and said interior area of said housing.

8. The bar top gaming unit in accordance with claim 1 further comprising a vent cover located over said first end of said air port.

9. The bar top gaming unit in accordance with claim 1 wherein at least a portion of said housing is located beneath a top surface of a bar, said top deck is located above said top surface, and said first end of said air port extends through a front wall of said bar.

10. A bar top gaming unit comprising:
- a housing having a front and a rear and a bottom and top;
- at least one game display located at said top, said at least one game display configured to display game play information in an orientation to be viewed by a player located at said front of said housing; and
- an operator interface located at said rear of said housing, said operator interface comprising at least one display configured to display game play information in an orientation generally opposite that of the at least one game display for viewing by an operator located at said rear of said housing.

11. The bar top gaming unit in accordance with claim 10 wherein said top of said housing slopes upwardly from said front towards said rear.

12. The bar top gaming unit in accordance with claim 10 wherein said top of said housing is defined at least in part by a moveable top panel.

13. The bar top gaming unit in accordance with claim 10 wherein said at least one game display slopes upwardly moving from said front to said rear of said housing, whereby said at least one game display is tilted towards a player located at said front of said housing.

14. The bar top gaming unit in accordance with claim 10 wherein said rear of said housing is generally vertically extending.

15. The bar top gaming unit in accordance with claim 12 wherein said top panel has a front corresponding to said front of said housing and a rear corresponding to said rear of said housing and said operator interface is associated with said rear of said top panel.

16. The bar top gaming unit in accordance with claim 10 wherein said at least one display of said operator interface comprises at least one meter.

17. The bar top gaming unit in accordance with claim 16 wherein said at least one meter displays numerical values.

18. The bar top gaming unit in accordance with claim 10 wherein said at least one display comprises an electronic video display.

19. The bar top gaming unit in accordance with claim 18 wherein said at least one electronic video display is configured at one or more times to display the same information as said at least one game display.

* * * * *